United States Patent
Long et al.

(10) Patent No.: US 12,341,586 B2
(45) Date of Patent: Jun. 24, 2025

(54) MULTI-WAVEFORM STEERING VECTOR COMPUTATION ENGINE

(71) Applicant: BAE SYSTEMS Information and Electronic Systems Integration Inc., Nashua, NH (US)

(72) Inventors: Ryan E. Long, Epsom, NH (US); Christopher M. Muller, Milford, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 18/455,264

(22) Filed: Aug. 24, 2023

(65) Prior Publication Data

US 2025/0070835 A1    Feb. 27, 2025

(51) Int. Cl.
*H04B 7/06* (2006.01)
*G01S 3/14* (2006.01)

(52) U.S. Cl.
CPC ............ *H04B 7/0617* (2013.01); *G01S 3/143* (2013.01)

(58) Field of Classification Search
CPC .............................. H04B 7/0617; G01S 3/143
See application file for complete search history.

(56) References Cited

U.S. PATENT DOCUMENTS

| | | |
|---|---|---|
| 6,271,787 B1 | 8/2001 | Springer et al. |
| 6,531,976 B1 | 3/2003 | Yu |
| 7,038,618 B2 | 5/2006 | Budic |
| 9,829,568 B2 | 11/2017 | Woodsum |
| 11,194,030 B2 | 12/2021 | Destefano et al. |
| 11,205,844 B2 | 12/2021 | Longman et al. |
| 11,271,301 B2 | 3/2022 | Tzadok et al. |
| 11,408,994 B2 | 8/2022 | Roemer |
| 11,609,306 B2 | 3/2023 | Thiagarajan |
| 2005/0237236 A1 | 10/2005 | Budic |
| 2017/0098891 A1* | 4/2017 | Nishimoto ............ G01S 13/42 |
| 2022/0120851 A1 | 4/2022 | Prager et al. |

FOREIGN PATENT DOCUMENTS

| | | |
|---|---|---|
| EP | 2762916 B1 | 11/2017 |
| WO | WO2002097467 A3 | 12/2002 |
| WO | WO2020023242 A1 | 1/2020 |

* cited by examiner

*Primary Examiner* — Rahel Guarino
(74) *Attorney, Agent, or Firm* — Gary McFaline

(57) ABSTRACT

Techniques are provided for steering vector generation. A methodology implementing the techniques according to an embodiment includes converting time domain data received from an antenna array to channelized frequency domain data. The method also includes receiving a request from a signal detection system, the request including a timestamp and duration of a detected signal of interest (SOI) and an indication that the SOI is pulsed or continuous. The method further includes generating, for a pulsed SOI, steering vectors to steer the antenna array to the pulsed SOI based on a segment of the time domain data stored in a first memory and identified by the time stamp and duration; and generating, for a continuous SOI, steering vectors to steer the antenna array to the continuous SOI based on a segment of the channelized frequency domain data stored in a second memory and identified by the time stamp and duration.

20 Claims, 7 Drawing Sheets

MULTI-WAVEFORM STEERING VECTOR COMPUTATION ENGINE

STATEMENT OF GOVERNMENT INTEREST

This invention was made with United States Government assistance under Contract No. 1033000044. The United States Government has certain rights in this invention.

FIELD OF DISCLOSURE

The present disclosure relates to steering vectors, and more particularly to multi-waveform steering vector computation.

BACKGROUND

Signals received from the antennas of an antenna array can be weighted to steer a beam in a desired direction, for example towards an emitter of interest. The generation of these weights, which are referred to collectively as a steering vector, can be computationally expensive. Difficulties can arise in applications where many steering vectors need to be generated in parallel and in real-time, for example to handle multiple emitters.

Figure 1:
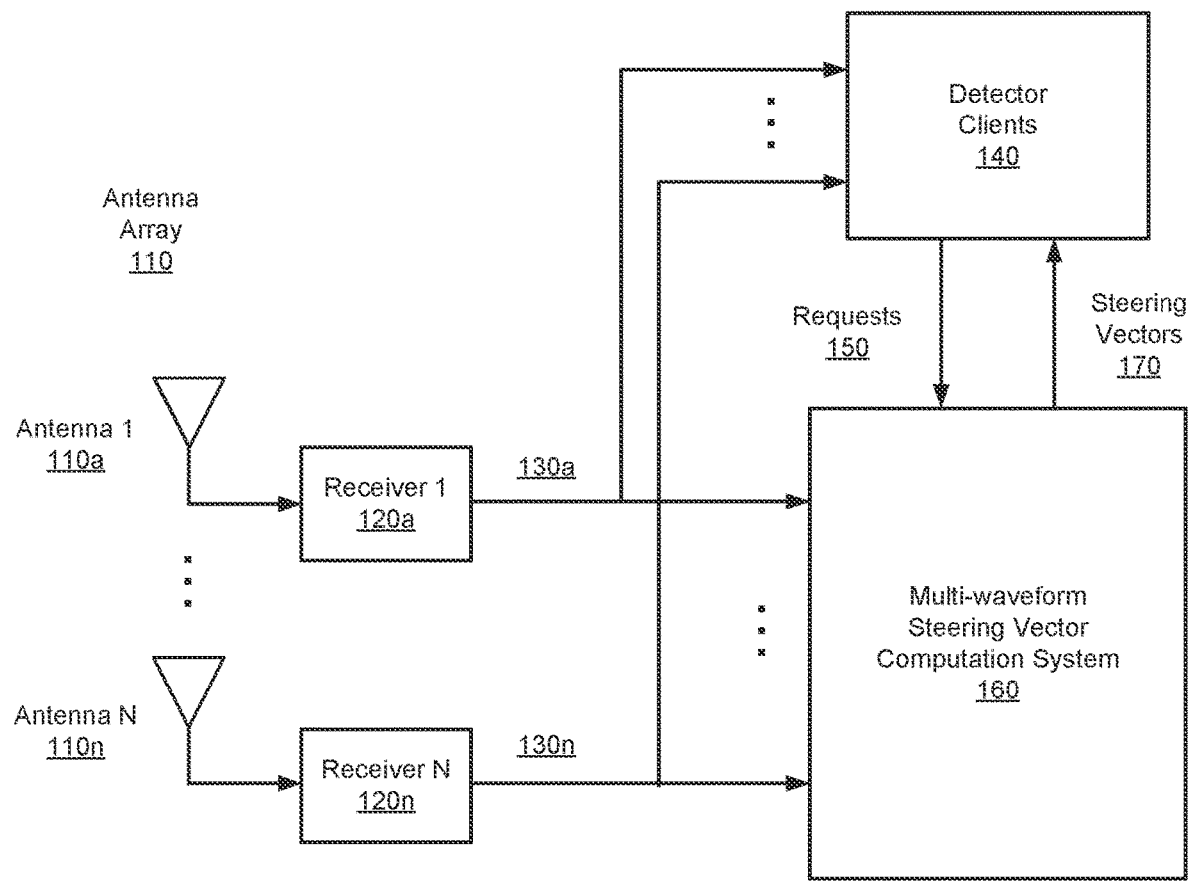
FIG. 1 illustrates a signal acquisition platform, in accordance with certain embodiments of the present disclosure.

Although the following Detailed Description will proceed with reference being made to illustrative embodiments, many alternatives, modifications, and variations thereof will be apparent in light of this disclosure.

DETAILED DESCRIPTION

Techniques are provided herein for multi-waveform steering vector computation. As noted above, the generation of steering vector weights can be computationally expensive and difficulties can arise in applications where many steering vectors need to be generated in parallel and in real-time, for example to handle large numbers of emitters.

To this end, and in accordance with an embodiment of the present disclosure, a multi-waveform steering vector computation system is disclosed which has the capability to generate hundreds of thousands of steering vectors (or more) per second for multiple emitter types, including both pulsed waveforms, such as radar signals, and continuous waveforms, such as communication signals. The system is implemented in a manner that allows for parallel processing with massive scalability to meet the needs of challenging (e.g., target rich) applications. The resulting steering vectors may be used by other processing applications for direction finding and tracking.

In accordance with an embodiment, a multi-waveform steering vector computation system includes a first delay memory bank to store time domain data received from an antenna array. The system also includes a Fourier transform filter bank configured to convert the time domain data to channelized frequency domain data for storage in a second delay memory bank. The system further includes a computation engine configured to receive a request from a signal detection system (e.g., a detector client), wherein the request includes one or more of a timestamp, duration, frequency, bandwidth, and chirp rate of a detected signal of interest (SOI) and an indication that the SOI is a pulsed SOI or a continuous SOI. The computation engine comprises a pulse waveform steering vector computation engine and a continuous waveform steering vector computation engine. The pulse waveform steering vector computation engine is configured to generate steering vectors to steer the antenna array to the pulsed SOI based on a segment of the time domain data stored in the first memory bank and identified by the time stamp and the duration. The continuous waveform steering vector computation engine is configured to generate steering vectors to steer the antenna array to the continuous SOI based on a segment of the channelized frequency domain data stored in the second memory and identified by the time stamp and the duration. The use of the first and second memories allow for the generation of steering vectors, post-detection, using the same data that the detector clients analyzed, in real-time, to make the detections.

It will be appreciated that the techniques described herein may provide improved steering vector computation performance, flexibility, and throughput, compared to systems that are not readily scalable and do not handle multiple types of waveforms. Numerous embodiments and applications will be apparent in light of this disclosure.

System Architecture

FIG. 1 illustrates a signal acquisition platform 100, in accordance with certain embodiments of the present disclosure. The signal acquisition platform 100 is shown to include an antenna array 110, a bank of receivers 120, detector clients 140, and a multi-waveform steering vector computation system 160.

The antenna array 110 includes two or more antennas 110a, ... 100n. The antenna array may be steered to amplify signals from any desired direction (and attenuate signals in other directions) based on the application of weighting factors. A steering vector comprises the weighting factors to be used for each of the N antennas. The antennas 110a, ... 100n are coupled to N corresponding RF receivers (or front ends) 120a, ... 120n. The bank of RF receivers 120 are configured to receive RF signals from the antennas, perform any suitable amplification and filtering on those signals, and convert the signals down to digital baseband signals 130a, ... 130n, at a sampling rate $F_s$.

The detector clients 140 are configured to analyze the digital signals 130 and detect the presence of SOIs. In some embodiments, there may be relatively large numbers of detector clients capable of generating hundreds of thousands of detections (or more) per second. The detector clients 140 may use any suitable techniques, to detect SOIs based on the properties of the SOIs and the applications. In response to the detection of an SOI, a detector client generates a request 150 to the multi-waveform steering vector computation system 160. The request includes a timestamp and duration of the SOI as well as characteristics of the transmitted waveform of the SOI such as, for example, frequency, bandwidth, and chirp rate as well as an indication that the SOI is a pulsed SOI or a continuous SOI. While detector clients 140 may use any number of possible techniques, one example approach that is particularly well suited for the steering vector computation system 160 includes the use of a matched filter. In this matched filter approach, the detector client applies a number of hypothetical signal parameters paired with a correlation function and reports the highest probable match, along with the signal parameters.

The multi-waveform steering vector computation system 160 is configured to act on the requests 150 received from the detector clients 140 to generate steering vectors 170 for the SOIs based on the provided characteristics, as will be described in greater detail below. The steering vectors are provided back to the requesting client 140, or other interested parties, for further analysis and processing of the SOIs. The multi-waveform steering vector computation system 160 employs parallel processing and is scalable to be able to respond to large numbers of requests and generate hundreds of thousands of steering vectors (or more) per second.

Figure 2:
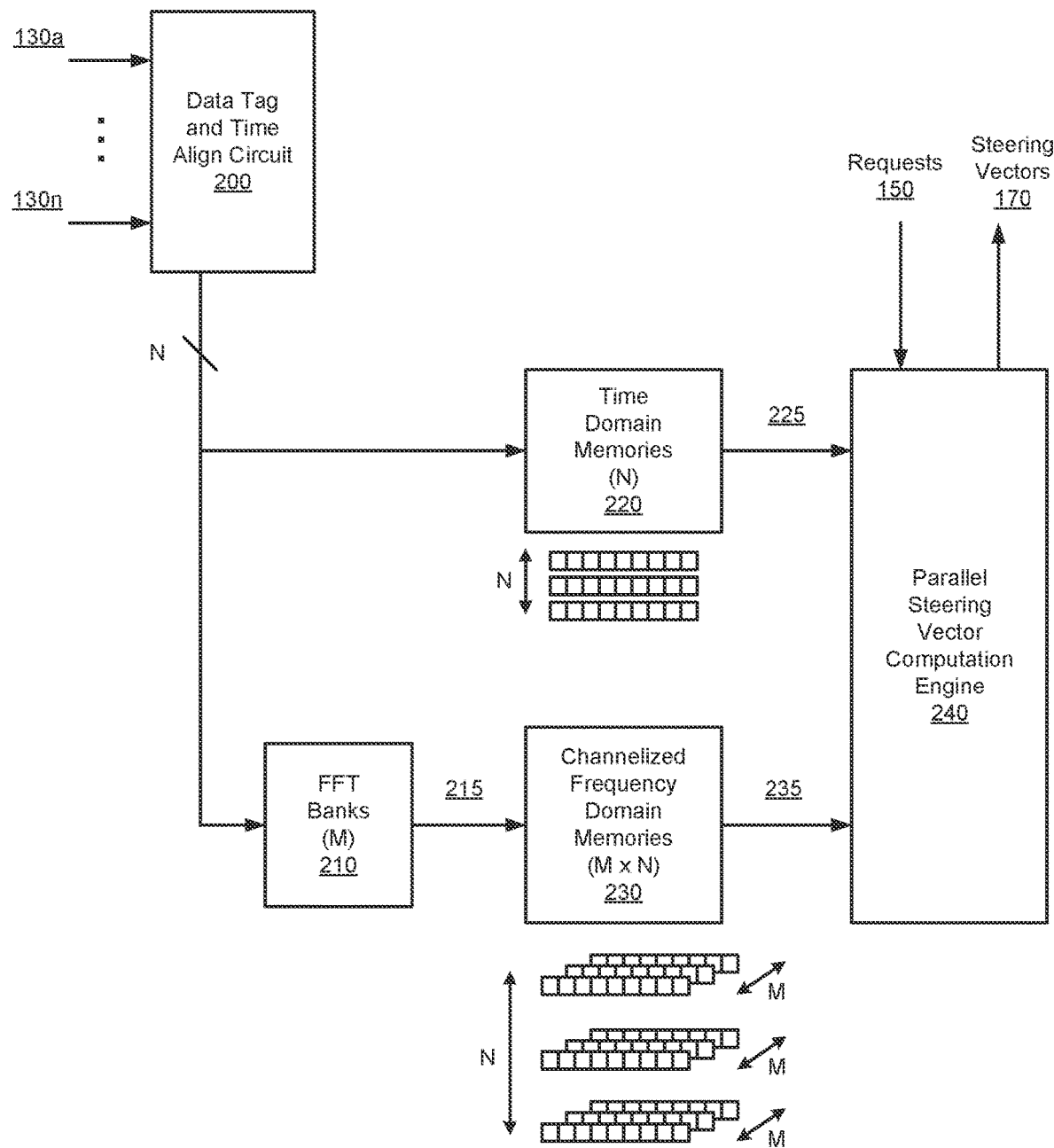
FIG. 2 is a block diagram of a multi-waveform steering vector computation system of the signal acquisition system of FIG. 1, configured in accordance with certain embodiments of the present disclosure.

FIG. 2 is a block diagram of a multi-waveform steering vector computation system 160 of the signal acquisition system 100 of FIG. 1, configured in accordance with certain embodiments of the present disclosure. The multi-waveform steering vector computation system 160 is shown to include a data tag and time align circuit 200, time domain memories 220, fast Fourier transform (FFT) banks 210, channelized frequency domain memories 230, and a parallel steering vector computation engine 240.

The data tag and time align circuit 200 is configured to receive the time domain digital baseband signals 130a, . . . 130n. In some embodiments, the time domain data 130 may be streamed from the receivers 120a, . . . 120n, over a network interface (e.g., Ethernet) or a local bus interface (e.g., PCI express), although any suitable mechanism may be used. The data tag and time align circuit 200 is configured to time align the streams and tag the samples with a time stamp.

The time domain memories 220 are configured to store the time aligned time domain data and associated time stamps. In some embodiments, there may be N time domain memories, one for each of the N receivers 120.

The FFT banks 210 are configured to convert time domain data 130 to channelized frequency domain data 215 for storage into the channelized frequency domain memories 230. In some embodiments, there may be M×N channelized frequency domain memories, where N is the number of receivers 120, and M is the number of frequency channels. For example, if the time domain signals span a frequency bandwidth of 1 MHZ, and the system is configured to analyze channels with a bandwidth of 25 kHz, the FFT banks will generate M=40 (1 MHZ/25 kHz=40) frequency domain channels for each of the N time domain signals.

The use of memories 220 and 230 allow the parallel steering vector computation engine 240 to operate, post detection, on the same data that the detector clients 140 analyzed in real-time to make the detections. In some embodiments, the size of these memories may be based on the maximum anticipated time delay for a request based on an SOI detection to be received, such that the data is still available in the memories.

The parallel steering vector computation engine 240 is configured to retrieve data from the time domain memories 220 and/or the channelized frequency domain memories 230 based on requests 150 received from the detector clients 140. The requests 150 include timestamps and durations (e.g., number of samples) that specify the locations from which data is to be fetched from the memories for the calculation of steering vectors, as described below.

Figure 3:
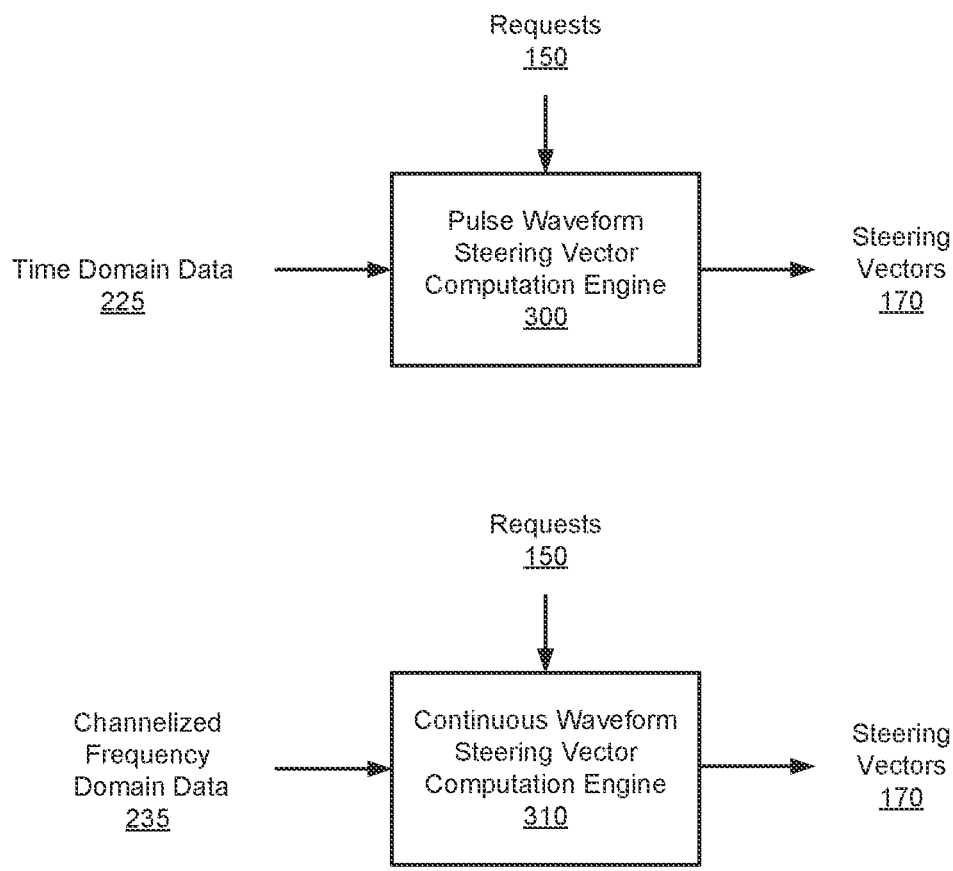
FIG. 3 is a block diagram of a parallel steering vector computation engine of the multi-waveform steering vector computation system of FIG. 2, configured in accordance with certain embodiments of the present disclosure.

FIG. 3 is a block diagram of a parallel steering vector computation engine 240 of the multi-waveform steering vector computation system 160 of FIG. 2, configured in accordance with certain embodiments of the present disclosure. The parallel steering vector computation engine 240 is shown to include a pulse waveform steering vector computation engine 300 and a continuous waveform steering vector computation engine 310. In some embodiments, any number of pulse waveform steering vector computation engines 300 and continuous waveform steering vector computation engines 310 may be employed to work in parallel to handle the volume of requests 150 received from the detector clients 140.

The pulse waveform steering vector computation engine 300 is configured to generate steering vectors 170 in response to a request 150 indicating that the SOI is a pulsed signal, such as, for example, a radar pulse. The steering vectors are generated to steer the antenna array to the pulsed SOI based on segments of the time domain data 225 stored in the time domain memories 220. The segments are identified by the time stamp and duration which are also provided in the request 150. Operation of the pulse waveform steering vector computation engine 300 will be described in greater detail below in connection with FIG. 4.

The continuous waveform steering vector computation engine 310 is configured to generate steering vectors 170 in response to a request 150 indicating that the SOI is a continuous signal, such as, for example, a communication signal. The steering vectors are generated to steer the antenna array to the continuous SOI based on segments of the channelized frequency domain data 235 stored in the channelized frequency domain memories 230. The segments are identified by the time stamp and duration which are also provided in the request 150. Operation of the continuous waveform steering vector computation engine 310 will be described in greater detail below in connection with FIG. 5.

Figure 4:
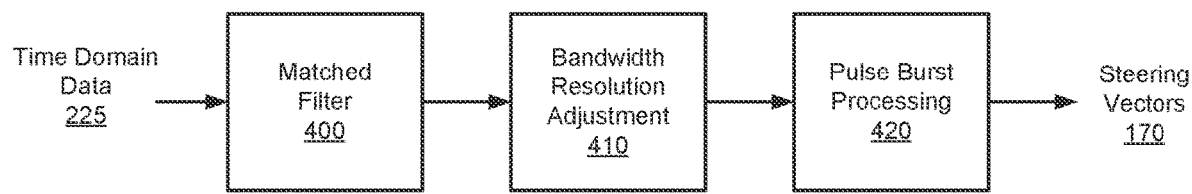
FIG. 4 is a block diagram of a pulse waveform steering vector computation engine of the parallel steering vector computation engine of FIG. 3, configured in accordance with certain embodiments of the present disclosure.

FIG. 4 is a block diagram of a pulse waveform steering vector computation engine 300 of the parallel steering vector computation engine 240 of FIG. 3, configured in accordance with certain embodiments of the present disclosure. The pulse waveform steering vector computation engine 300 is shown to include a matched filter 400, a bandwidth resolution adjustment circuit 410, and a pulse burst processing circuit 420.

The matched filter 400 is configured to perform matched filtering, on the specified segment of the time domain data 225 in the time domain memories 220, to generate the steering vectors for the pulsed SOI. The matched filter is based on detected parameters and characteristics of the pulsed SOI as provided in the requests 150 from the signal detection system. In some embodiments, the matched filter calculation for a steering vector A may be expressed, for m=1 to N, as:

$$A_{k,m} = \sum_{n=0}^{N_{samp}-1} \frac{y(m,n) * e^{-\pi i \frac{2F_c n + beta * n^2}{F_s}}}{N_{samp}}$$

where $A_{k,m}$ is a complex number representing the min element of the steering vector for the pulsed SOI designated by k. In this equation $N_{samp}$ is the number of samples retrieved from memory for the specified duration, y(m,n) is the $n_{th}$ sample of the pulsed SOI signal from the min stream (e.g., from the $m_{th}$ antenna and $m_{th}$ receiver), $F_c$ is the center frequency of the pulsed SOI, beta is the chirp rate of the pulsed SOI, and $F_s$ is the sampling rate.

In some embodiments, steering vectors A may be calculated in parallel, for multiple pulsed SOIs, k=1 to L, where L may be a relatively large number (e.g., greater than 100). For example, a first detector can request a calculation of A for a first pulsed SOI (k=1) located at a first address in the time domain memories along with the characteristics of that first signal (e.g., $N_{samp}$, $F_c$, and beta). A second detector can request a calculation of A for a second pulsed SOI (k=2) located at a second address in the time domain memories along with the characteristics of that second signal, and so on, wherein some or all of these calculations may be performed in parallel.

The bandwidth resolution adjustment circuit 410 is configured to coherently average multiple steering vectors generated for the pulsed SOI at different frequencies. The resolution bandwidth of the steering vectors $A_k$ is defined by the ratio $F_s/N_{samp}$. In some embodiments, the system can employ bandwidth resolution adjustment circuit 410 to provide steering vector results with a wider resolution bandwidth by coherently averaging two or more results together where the down conversion center frequency $F_c$ is offset by a multiple of $F_s/N_{samp}$. For example, if the duration of a request results in a 25 kHz BW resolution (based on $F_s$ and $N_{samp}$), but the waveform was modulated at a 50 KHz BW, then two steering vectors may be generated, offset from each other by 25 kHz and then coherently summed to provide the wider 50 kHz resolution BW.

For short duration pulses, such as Doppler bursts that have phase coherency from pulse to pulse, with a pulse train defined by a pulse repetition interval (PRI), the pulse burst processing circuit 420 is configured to coherently sum steering vectors generated for the multiple pulses that are offset in time by the PRI. The PRI may be an additional characteristic of the signal which is provided by the detector clients 140. Multiple steering vector estimates, separated by the PRI, are coherently summed in parallel to improve the estimate of the steering vector. Prior to summation, the steering vectors are phase aligned (e.g., the phase of the vectors is normalized to one of the antennas which can be set/rotated to zero degrees phase) such that the summation is coherent.

As one example application of the matched filter process, a radar waveform with a 5 MHz linear swept FM (LFM) Bandwidth can be processed in a much narrower bandwidth by employing a matched filter to de-spread the LFM signal in the client detector and subsequently re-creating the waveform in the steering vector compute engine. This de-spreading function essentially provides the frequency and rate match to remove the LFM and recover the baseband fixed frequency signal. In this example, if the baseband fixed frequency signal is processed in a 500 kHz bandwidth (post matched filter detection), a processing gain of 10*log 10 (5M/500 k)=10 dB is realized, which roughly equates to a doubling of the effective range of the system when compared to traditional detection techniques.

Figure 5:
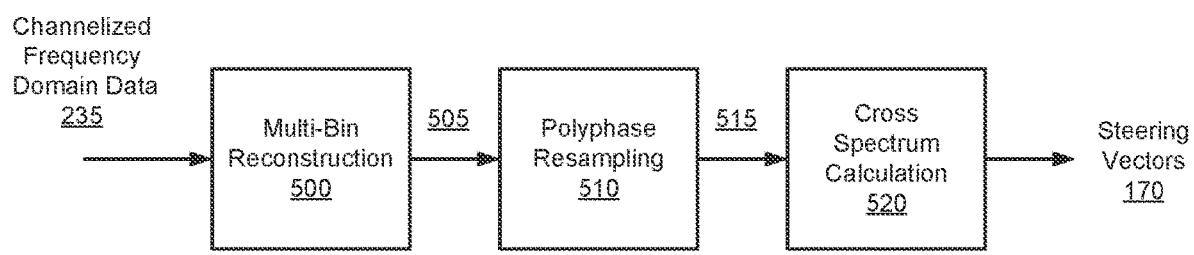
FIG. 5 is a block diagram of a continuous waveform steering vector computation engine of the parallel steering vector computation engine of FIG. 3, configured in accordance with certain embodiments of the present disclosure.

FIG. 5 is a block diagram of a continuous waveform steering vector computation engine 310 of the parallel steering vector computation engine 240 of FIG. 3, configured in accordance with certain embodiments of the present disclosure. The continuous waveform steering vector computation engine 310 is shown to include a multi-bin reconstruction circuit 500, a polyphase resampling circuit 510, and a cross spectrum calculation circuit 520.

For longer duration signals, such as communication signals and other such radio emissions, the system utilizes data 235 from the channelized frequency domain memories 230. The detector clients 140 provide the emitted frequency, bandwidth, and duration which are used to retrieve the appropriate channelized data from the memory 230 for each antenna stream.

The multi-bin reconstruction circuit 500 is configured to recombine two or more channels (the M bins) of the channelized frequency domain data 235 in the channelized frequency domain memories 230 into a time domain data stream 505 (for each of the N antenna streams) based on parameters of the continuous SOI provided by the signal detection system. Multi-bin reconstruction may be implemented using any suitable technique, for example by up-sampling and coherently summing the up-sampled bins.

The polyphase resampling circuit 510 is configured to resample the time domain data stream 505 to a resampled data stream 515 at a desired final sampling rate, for example if that desired rate is not a multiple of the channelizer bin resolution. The desired final sampling rate is provided by the detector clients 140. Polyphase resampling may be implemented using any suitable technique, for example, resampling the recombined bins at a ratio of p/q, where p is the up-sampling rate and q is the down-sampling rate, to achieve the final desired sampling rate. An anti-aliasing filter is typically applied to maintain the bandwidth of the input waveform during the resampling process.

The cross spectrum calculation circuit 520 is configured to compute the steering vectors 170 for the continuous SOI based on a calculation of cross spectra between the resampled time domain data streams 515, y(m,n), using one stream, y(0,n), as a reference waveform. In some embodiments, this can be expressed as:

$$A_{k,m} = \sum_{n=0}^{N_{samp}-1} y(m,n) \cdot y(0,n)^*$$

where $A_{k,m}$ is a complex number representing the min element of the steering vector for the continuous SOI designated by k. In this equation $N_{samp}$ is the number of samples retrieved from memory for the specified duration, and y(m,n) is the $n_{th}$ sample of the resampled waveform 515 for the min stream (e.g., from the $m_{th}$ antenna and min receiver), and the * symbol represents the complex conjugate operation.

Methodology

Figure 6:
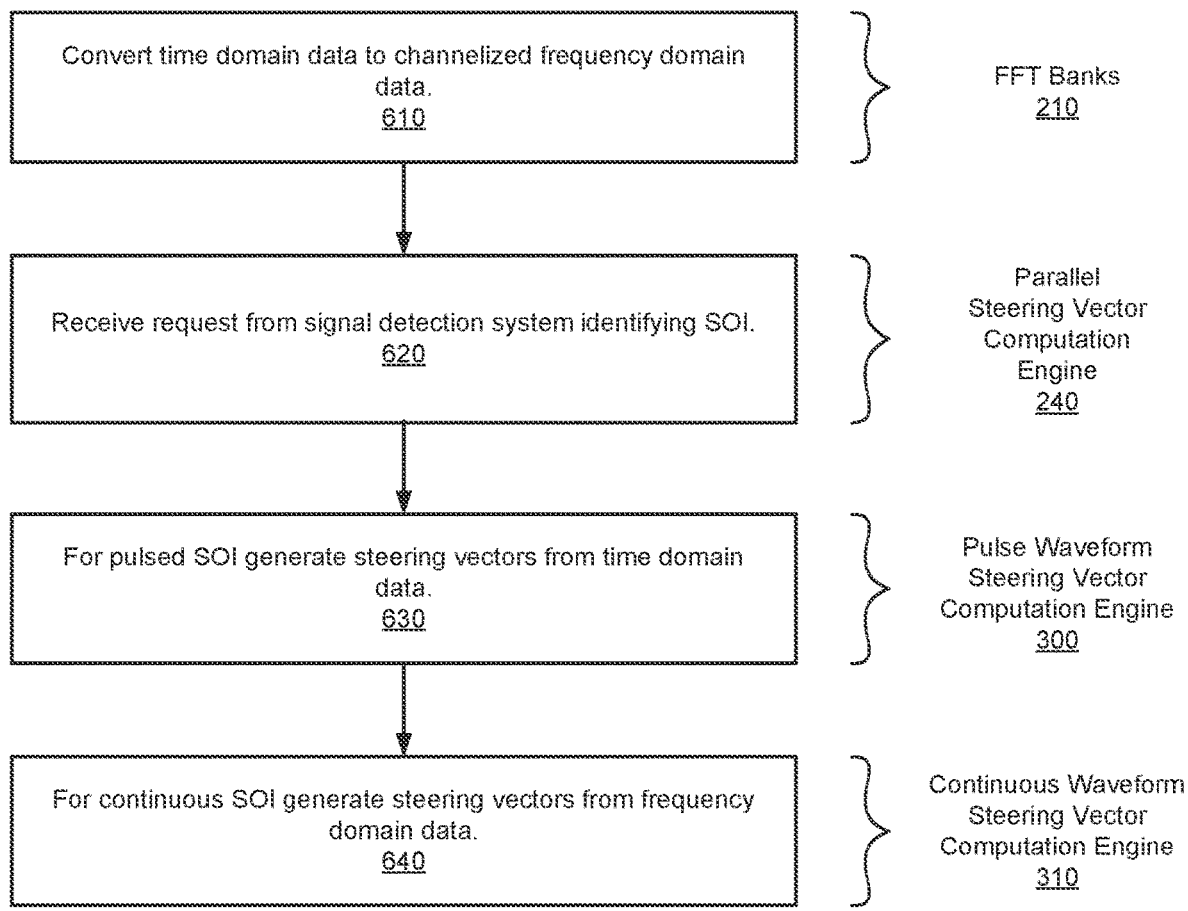
FIG. 6 is a flowchart illustrating a methodology for multi-waveform steering vector computation, in accordance with an embodiment of the present disclosure.

FIG. 6 is a flowchart illustrating a methodology 600 for multi-waveform steering vector computation, in accordance with an embodiment of the present disclosure. As can be seen, example method 600 includes a number of phases and sub-processes, the sequence of which may vary from one embodiment to another. However, when considered in aggregate, these phases and sub-processes form a process for operation of a multi-waveform steering vector computation system, in accordance with certain of the embodiments disclosed herein, for example as illustrated in FIGS. 1-5, as described above. However other system architectures can be used in other embodiments, as will be apparent in light of this disclosure. To this end, the correlation of the various functions shown in FIG. 6 to the specific components illustrated in the figures, is not intended to imply any structural and/or use limitations. Rather other embodiments may include, for example, varying degrees of integration wherein multiple functionalities are effectively performed by one system. Numerous variations and alternative configurations will be apparent in light of this disclosure.

In one embodiment, method 600 commences, at operation 610, by converting time domain data, received from an antenna array and stored in a first memory, to channelized frequency domain data. The channelized frequency domain data stored in a second memory.

At operation 620, a request for steering vector generation is received from a signal detection system. The request includes a timestamp and duration of a detected SOI which is used to identify the location of the SOI stored in the first and second memories. The request may also include an indication that the SOI is a pulsed SOI or a continuous SOI.

At operation 630, in response to an indication that the SOI is a pulsed SOI, steering vectors are generated to steer the antenna array to the pulsed SOI based on a segment of the time domain data stored in the first memory. The segment in the first memory is identified by the time stamp and the duration. In some embodiments, the steering vectors are generated by applying a matched filter to the segment based on parameters of the pulsed SOI that have been identified and provided by the signal detection system. In some embodiments, provided pulse parameters may include sampling rate, duration, center frequency, PRI, and chirp rate.

At operation 640, in response to the indication that the SOI is a continuous SOI, steering vectors are generated to steer the antenna array to the continuous SOI based on segments of the channelized frequency domain data stored in the second memory. The segments in the second memory are identified by the time stamp and the duration. In some embodiments, two or more segments of channels of the channelized frequency domain data in the second memory are recombined into a time domain data stream based on parameters of the continuous SOI that have been identified and provided by the signal detection system. In some embodiments, provided parameters may include emitter frequency, bandwidth, and duration. The resulting time domain data stream may then be resampled to a desired sampling rate if needed. The steering vectors are then generated by calculating cross spectra between the resampled time domain data streams of each antenna of the antenna array versus one selected reference antenna of the antenna array.

Example System

Figure 7:
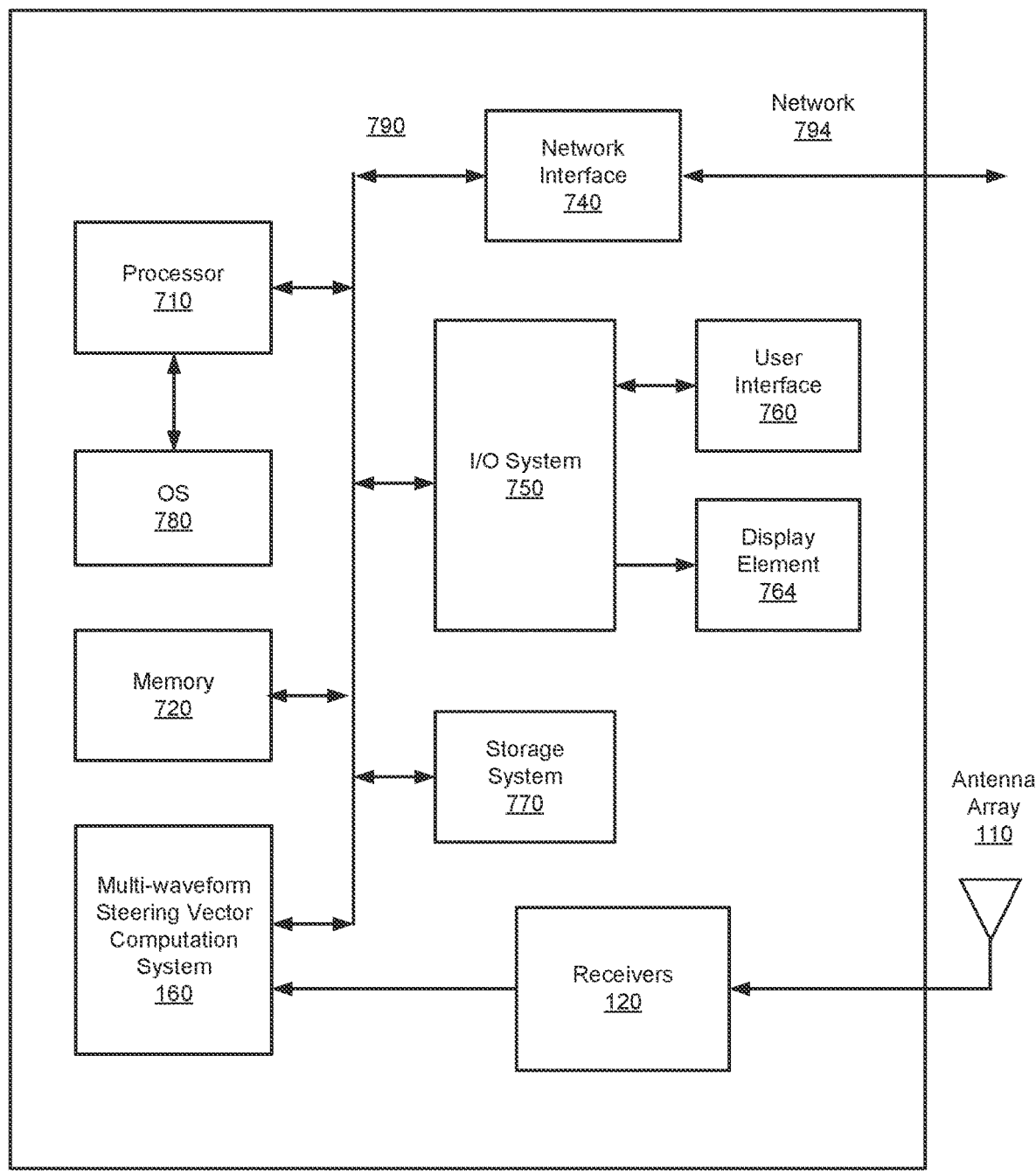
FIG. 7 is a block diagram of a processing platform configured to provide multi-waveform steering vector computation, in accordance with an embodiment of the present disclosure.

FIG. 7 is a block diagram of a processing platform 700 configured to provide multi-waveform steering vector computation, in accordance with an embodiment of the present disclosure. In some embodiments, platform 700, or portions thereof, may be hosted on, or otherwise be incorporated into the electronic systems of an aircraft or ship, including radar systems, communication systems, and the like. The disclosed techniques may be used to generate steering vector estimates for multiple emitter types, in parallel, using methods that are matched to the particular characteristics of the transmitted waveform of each emitter.

In some embodiments, platform 700 may comprise any combination of a processor 710, memory 720, multi-waveform steering vector computation system 160, a network interface 740, an input/output (I/O) system 750, a user interface 760, a display element 764, a storage system 770, and receivers (e.g., RF front ends) 120 for each antenna of the antenna array 110. As can be further seen, a bus and/or interconnect 790 is also provided to allow for communication between the various components listed above and/or other components not shown. Platform 700 can be coupled to a network 794 through network interface 740 to allow for communications with other computing devices, platforms, devices to be controlled, or other resources. Other componentry and functionality not reflected in the block diagram of FIG. 7 will be apparent in light of this disclosure, and it will be appreciated that other embodiments are not limited to any particular hardware configuration.

Processor 710 can be any suitable processor, and may include one or more coprocessors or controllers, such as an audio processor, a graphics processing unit, or hardware accelerator, to assist in the execution of mission software and/or any control and processing operations associated with platform 700, including operation of the multi-waveform steering vector computation system 160. In some embodiments, the processor 710 may be implemented as any number of processor cores. The processor (or processor cores) may be any type of processor, such as, for example, a micro-processor, an embedded processor, a digital signal processor (DSP), a graphics processor (GPU), a tensor processing unit (TPU), a network processor, a field programmable gate array or other device configured to execute code. The processors may be multithreaded cores in that they may include more than one hardware thread context (or "logical processor") per core. Processor 710 may be implemented as a complex instruction set computer (CISC) or a reduced instruction set computer (RISC) processor. In some embodiments, processor 710 may be configured as an x86 instruction set compatible processor.

Memory 720 can be implemented using any suitable type of digital storage including, for example, flash memory and/or random access memory (RAM). In some embodiments, the memory 720 may include various layers of memory hierarchy and/or memory caches as are known to those of skill in the art. Memory 720 may be implemented as a volatile memory device such as, but not limited to, a RAM, dynamic RAM (DRAM), or static RAM (SRAM) device. Storage system 770 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device.

Processor 710 may be configured to execute an Operating System (OS) 780 which may comprise any suitable operating system, such as Google Android (Google Inc., Mountain View, CA), Microsoft Windows (Microsoft Corp., Redmond, WA), Apple OS X (Apple Inc., Cupertino, CA), Linux, or a real-time operating system (RTOS). As will be appreciated in light of this disclosure, the techniques provided herein can be implemented without regard to the particular operating system provided in conjunction with platform 700, and therefore may also be implemented using any suitable existing or subsequently-developed platform.

Network interface circuit 740 can be any appropriate network chip or chipset which allows for wired and/or wireless connection between other components of platform 700 and/or network 794, thereby enabling platform 700 to communicate with other local and/or remote computing systems, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution) and 5G, Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 750 may be configured to interface between various I/O devices and other components of platform 700. I/O devices may include, but not be limited to, user interface 760 and display element 764. User interface 760 may include devices (not shown) such as a touchpad, cockpit display unit, keyboard, and mouse, etc., for example, to allow the user to control the system. Display element 764 may be configured to display information to a user. I/O system 750 may include a graphics subsystem configured to perform processing of images for rendering on the display element 764. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 710 or any chipset of platform 700.

It will be appreciated that in some embodiments, the various components of platform 700 may be combined or integrated in a system-on-a-chip (SoC) architecture. In some embodiments, the components may be hardware components, firmware components, software components or any suitable combination of hardware, firmware, or software.

Multi-waveform steering vector computation system 160 is configured to generate steering vector estimates for multiple emitter types, in parallel, using methods that are matched to the particular characteristics of the transmitted waveform of each emitter, as described previously. Multi-waveform steering vector computation system 160 may include any or all of the circuits/components illustrated in FIGS. 1-5, as described above. These components can be implemented or otherwise used in conjunction with a variety of suitable software and/or hardware that is coupled to or that otherwise forms a part of platform 700. These components can additionally or alternatively be implemented or otherwise used in conjunction with user I/O devices that are capable of providing information to, and receiving information and commands from, a user.

In various embodiments, platform 700 may be implemented as a wireless system, a wired system, or a combination of both. When implemented as a wireless system, platform 700 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, platform 700 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 794. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments platform 700 may comprise additional, fewer, or alternative subcomponents as compared to those included in the example embodiment of FIG. 7.

The aforementioned non-transitory computer readable medium may be any suitable medium for storing digital information, such as a hard drive, a server, a flash memory, and/or random-access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method, process, and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood, however, that other embodiments may be practiced without these specific details, or otherwise with a different set of details. It will be further appreciated that the specific structural and functional details disclosed herein are representative of example embodiments and are not necessarily intended to limit the scope of the present disclosure. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

FURTHER EXAMPLE EMBODIMENTS

The following examples pertain to further embodiments, from which numerous permutations and configurations will be apparent.

Example 1 is a steering vector computation system comprising: a Fourier transform filter bank configured to convert time domain data to channelized frequency domain data, the time domain data received from an antenna array and stored in a first memory, the channelized frequency domain data stored in a second memory; and a computation engine configured to receive a request from a signal detection system, wherein the request includes a timestamp and duration of a detected signal of interest (SOI) and an indication that the SOI is a pulsed SOI or a continuous SOI, the computation engine comprising a pulse waveform steering vector computation engine configured to generate steering vectors to steer the antenna array to the pulsed SOI based on a segment of the time domain data stored in the first memory and identified by the time stamp and the duration, and a continuous waveform steering vector computation engine configured to generate steering vectors to steer the antenna array to the continuous SOI based on a segment of the channelized frequency domain data stored in the second memory and identified by the time stamp and the duration.

Example 2 includes the system of Example 1, wherein the pulse waveform steering vector computation engine comprises a matched filter configured to perform matched filtering to generate the steering vectors for the pulsed SOI, the matched filtering performed on the segment of the time domain data in the first memory and based on parameters of the pulsed SOI provided by the signal detection system.

Example 3 includes the system of Examples 2 or 3, wherein the pulse waveform steering vector computation engine further comprises a bandwidth resolution adjustment circuit configured to coherently average a first steering vector generated for the pulsed SOI at a first frequency with a second steering vector generated for the pulsed SOI at a second frequency, the first frequency and the second frequency based on parameters of the pulsed SOI provided by the signal detection system.

Example 4 includes the system of any of Examples 1-3, wherein the pulse waveform steering vector computation engine further comprises a pulse burst processing circuit configured to coherently sum a first steering vector generated for a first pulse of the pulsed SOI with a second steering vector generated for a second pulse of the pulsed SOI, the second pulse offset in time by a pulse repetition interval (PRI) of the pulsed SOI, the PRI provided by the signal detection system.

Example 5 includes the system of any of Examples 1-4, wherein the continuous waveform steering vector computation engine comprises a multi-bin reconstruction circuit configured to recombine two or more channels of the channelized frequency domain data in the second memory into a time domain data stream based on parameters of the continuous SOI provided by the signal detection system.

Example 6 includes the system of Example 5, wherein the continuous waveform steering vector computation engine further comprises a polyphase resampling circuit configured to resample the time domain data stream based on a desired sampling rate provided by the signal detection system.

Example 7 includes the system of Example 6, wherein the continuous waveform steering vector computation engine further comprises a cross spectrum calculation circuit configured to calculate cross spectra between the resampled time domain data streams associated with antennas of the antenna array to generate the steering vectors for the continuous SOI.

Example 8 is a computer program product including one or more non-transitory machine-readable mediums encoded with instructions that when executed by one or more processors cause a process to be carried out for computation of steering vectors, the process comprising: converting time domain data to channelized frequency domain data, the time domain data received from an antenna array and stored in a first memory, the channelized frequency domain data stored in a second memory; receiving a request from a signal detection system, the request including a timestamp and duration of a detected signal of interest (SOI) and an indication that the SOI is a pulsed SOI or a continuous SOI; generating, in response to the indication that the SOI is a pulsed SOI, steering vectors to steer the antenna array to the pulsed SOI based on a segment of the time domain data stored in the first memory and identified by the time stamp and the duration; and generating, in response to the indication that the SOI is a continuous SOI, steering vectors to steer the antenna array to the continuous SOI based on a segment of the channelized frequency domain data stored in the second memory and identified by the time stamp and the duration.

Example 9 includes the computer program product of Example 8, wherein the process further comprises performing matched filtering to generate the steering vectors for the pulsed SOI, the matched filtering performed on the segment of the time domain data in the first memory and based on parameters of the pulsed SOI provided by the signal detection system.

Example 10 includes the computer program product of Examples 8 or 9, wherein the process further comprises coherently average a first steering vector generated for the pulsed SOI at a first frequency with a second steering vector generated for the pulsed SOI at a second frequency, the first frequency and the second frequency based on parameters of the pulsed SOI provided by the signal detection system.

Example 11 includes the computer program product of any of Examples 8-10, wherein the process further comprises a coherently summing a first steering vector generated for a first pulse of the pulsed SOI with a second steering vector generated for a second pulse of the pulsed SOI, the second pulse offset in time by a pulse repetition interval (PRI) of the pulsed SOI, the PRI provided by the signal detection system.

Example 12 includes the computer program product of any of Examples 8-11, wherein the process further comprises recombining two or more channels of the channelized frequency domain data in the second memory into a time domain data stream based on parameters of the continuous SOI provided by the signal detection system.

Example 13 includes the computer program product of Example 12, wherein the process further comprises performing polyphase resampling of the time domain data stream based on a desired sampling rate provided by the signal detection system.

Example 14 includes the computer program product of Example 13, wherein the process further comprises calculating cross spectra between the resampled time domain data streams associated with antennas of the antenna array to generate the steering vectors for the continuous SOI.

Example 15 is a method for computation of steering vectors, the method comprising: converting, by a processor-based system, time domain data to channelized frequency domain data, the time domain data received from an antenna array and stored in a first memory, the channelized frequency domain data stored in a second memory; receiving, by the processor-based system, a request from a signal detection system, the request including a timestamp and duration of a detected signal of interest (SOI) and an indication that the SOI is a pulsed SOI or a continuous SOI; generating, by the processor-based system, in response to the indication that the SOI is a pulsed SOI, steering vectors to steer the antenna array to the pulsed SOI based on a segment of the time domain data stored in the first memory and identified by the time stamp and the duration; and generating, by the processor-based system, in response to the indication that the SOI is a continuous SOI, steering vectors to steer the antenna array to the continuous SOI based on a segment of the channelized frequency domain data stored in the second memory and identified by the time stamp and the duration.

Example 16 includes the method of Example 15, further comprising performing matched filtering to generate the steering vectors for the pulsed SOI, the matched filtering performed on the segment of the time domain data in the first memory and based on parameters of the pulsed SOI provided by the signal detection system.

Example 17 includes the method of Examples 15 or 16, further comprising coherently average a first steering vector generated for the pulsed SOI at a first frequency with a second steering vector generated for the pulsed SOI at a second frequency, the first frequency and the second frequency based on parameters of the pulsed SOI provided by the signal detection system.

Example 18 includes the method of any of Examples 15-17, further comprising coherently summing a first steering vector generated for a first pulse of the pulsed SOI with a second steering vector generated for a second pulse of the pulsed SOI, the second pulse offset in time by a pulse repetition interval (PRI) of the pulsed SOI, the PRI provided by the signal detection system.

Example 19 includes the method of Example 15, further comprising recombining two or more channels of the channelized frequency domain data in the second memory into a time domain data stream based on parameters of the continuous SOI provided by the signal detection system.

Example 20 includes the method of Example 19, further comprising performing polyphase resampling of the time domain data stream based on a desired sampling rate provided by the signal detection system and calculating cross spectra between the resampled time domain data streams associated with antennas of the antenna array to generate the steering vectors for the continuous SOI.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. A steering vector computation system comprising:
   a Fourier transform filter bank configured to convert time domain data to channelized frequency domain data, the time domain data received from an antenna array and stored in a first memory, the channelized frequency domain data stored in a second memory; and
   a computation engine configured to receive a request from a signal detection system, wherein the request includes a timestamp and duration of a detected signal of interest (SOI) and an indication that the SOI is a pulsed SOI or a continuous SOI, the computation engine comprising:
      a pulse waveform steering vector computation engine configured to generate steering vectors to steer the antenna array to the pulsed SOI based on a segment of the time domain data stored in the first memory and identified by the time stamp and the duration, and
      a continuous waveform steering vector computation engine configured to generate steering vectors to steer the antenna array to the continuous SOI based on a segment of the channelized frequency domain data stored in the second memory and identified by the time stamp and the duration.

2. The system of claim 1, wherein the pulse waveform steering vector computation engine comprises a matched filter configured to perform matched filtering to generate the steering vectors for the pulsed SOI, the matched filtering performed on the segment of the time domain data in the first memory and based on parameters of the pulsed SOI provided by the signal detection system.

3. The system of claim 1, wherein the pulse waveform steering vector computation engine further comprises a bandwidth resolution adjustment circuit configured to coherently average a first steering vector generated for the pulsed SOI at a first frequency with a second steering vector generated for the pulsed SOI at a second frequency, the first frequency and the second frequency based on parameters of the pulsed SOI provided by the signal detection system.

4. The system of claim 1, wherein the pulse waveform steering vector computation engine further comprises a pulse burst processing circuit configured to coherently sum a first steering vector generated for a first pulse of the pulsed SOI with a second steering vector generated for a second pulse of the pulsed SOI, the second pulse is offset in time by a pulse repetition interval (PRI) of the pulsed SOI, the PRI provided by the signal detection system.

5. The system of claim 1, wherein the continuous waveform steering vector computation engine comprises a multi-bin reconstruction circuit configured to recombine two or more channels of the channelized frequency domain data in the second memory into a time domain data stream based on parameters of the continuous SOI provided by the signal detection system.

6. The system of claim 5, wherein the continuous waveform steering vector computation engine further comprises a polyphase resampling circuit configured to resample the time domain data stream based on a desired sampling rate provided by the signal detection system.

7. The system of claim 6, wherein the continuous waveform steering vector computation engine further comprises a cross spectrum calculation circuit configured to calculate cross spectra between the resampled time domain data stream associated with antennas of the antenna array to generate the steering vectors for the continuous SOI.

8. One or more non-transitory machine-readable mediums encoded with instructions that when executed by one or more processors cause a process to be carried out for computation of steering vectors, the process comprising:
   converting time domain data to channelized frequency domain data, the time domain data received from an antenna array and stored in a first memory, the channelized frequency domain data stored in a second memory;

receiving a request from a signal detection system, the request including a timestamp and duration of a detected signal of interest (SOI) and an indication that the SOI is a pulsed SOI or a continuous SOI;

generating, in response to the indication that the SOI is the pulsed SOI, steering vectors to steer the antenna array to the pulsed SOI based on a segment of the time domain data stored in the first memory and identified by the time stamp and the duration; and generating, in response to the indication that the SOI is the continuous SOI, steering vectors to steer the antenna array to the continuous SOI based on a segment of the channelized frequency domain data stored in the second memory and identified by the time stamp and the duration.

9. The one or more non-transitory machine-readable mediums of claim 8, wherein the process further comprises performing matched filtering to generate the steering vectors for the pulsed SOI, the matched filtering performed on the segment of the time domain data in the first memory and based on parameters of the pulsed SOI provided by the signal detection system.

10. The one or more non-transitory machine-readable mediums of claim 8, wherein the process further comprises coherently average a first steering vector generated for the pulsed SOI at a first frequency with a second steering vector generated for the pulsed SOI at a second frequency, the first frequency and the second frequency based on parameters of the pulsed SOI provided by the signal detection system.

11. The one or more non-transitory machine-readable mediums of claim 8, wherein the process further comprises, in response to the indication that the SOI is the pulsed SOI, a coherently summing a first steering vector generated for a first pulse of the pulsed SOI with a second steering vector generated for a second pulse of the pulsed SOI, the second pulse offset in time by a pulse repetition interval (PRI) of the pulsed SOI, the PRI provided by the signal detection system.

12. The one or more non-transitory machine-readable mediums of claim 8, wherein the process further comprises recombining two or more channels of the channelized frequency domain data in the second memory into a time domain data stream based on parameters of the continuous SOI provided by the signal detection system.

13. The one or more non-transitory machine-readable mediums of claim 12, wherein the process further comprises performing polyphase resampling of the time domain data stream based on a desired sampling rate provided by the signal detection system.

14. The one or more non-transitory machine-readable mediums of claim 13, wherein the process further comprises calculating cross spectra between the resampled time domain data stream associated with antennas of the antenna array to generate the steering vectors for the continuous SOI.

15. A method for computation of steering vectors, the method comprising:

converting, by a processor-based system, time domain data to channelized frequency domain data, the time domain data received from an antenna array and stored in a first memory, the channelized frequency domain data stored in a second memory;

receiving, by the processor-based system, a request from a signal detection system, the request including a timestamp and duration of a detected signal of interest (SOI) and an indication that the SOI is a pulsed SOI or a continuous SOI;

generating, by the processor-based system, in response to the indication that the SOI is the pulsed SOI, steering vectors to steer the antenna array to the pulsed SOI based on a segment of the time domain data stored in the first memory and identified by the time stamp and the duration; and generating, by the processor-based system, in response to the indication that the SOI is the continuous SOI, steering vectors to steer the antenna array to the continuous SOI based on a segment of the channelized frequency domain data stored in the second memory and identified by the time stamp and the duration.

16. The method of claim 15, further comprising performing matched filtering to generate the steering vectors for the pulsed SOI, the matched filtering performed on the segment of the time domain data in the first memory and based on parameters of the pulsed SOI provided by the signal detection system.

17. The method of claim 15, further comprising coherently average a first steering vector generated for the pulsed SOI at a first frequency with a second steering vector generated for the pulsed SOI at a second frequency, the first frequency and the second frequency based on parameters of the pulsed SOI provided by the signal detection system.

18. The method of claim 15, further comprising coherently summing a first steering vector generated for a first pulse of the pulsed SOI with a second steering vector generated for a second pulse of the pulsed SOI, the second pulse is offset in time by a pulse repetition interval (PRI) of the pulsed SOI, the PRI provided by the signal detection system.

19. The method of claim 15, further comprising recombining two or more channels of the channelized frequency domain data in the second memory into a time domain data stream based on parameters of the continuous SOI provided by the signal detection system.

20. The method of claim 19, further comprising performing polyphase resampling of the time domain data stream based on a desired sampling rate provided by the signal detection system and calculating cross spectra between the resampled time domain data stream associated with antennas of the antenna array to generate the steering vectors for the continuous SOI.

* * * * *